(12) United States Patent
Barter et al.

(10) Patent No.: US 8,673,480 B2
(45) Date of Patent: Mar. 18, 2014

(54) SUPPORT FEATURE FOR JOINING OF BATTERY CELL TABS

(75) Inventors: Stuart D. Barter, Lima, NY (US); William L. Martz, Victor, NY (US); Benjamin D. Kaufman, Fairport, NY (US); Michael Duffield, Medina, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 311 days.

(21) Appl. No.: 12/834,319

(22) Filed: Jul. 12, 2010

(65) Prior Publication Data

US 2012/0009462 A1  Jan. 12, 2012

(51) Int. Cl.
*H01M 6/42* (2006.01)

(52) U.S. Cl.
USPC ........................................ 429/159; 429/120

(58) Field of Classification Search
USPC ........................... 429/120, 99, 159
See application file for complete search history.

(56) References Cited

U.S. PATENT DOCUMENTS

| 7,291,422 | B2 * | 11/2007 | Oogami et al. | 429/152 |
|---|---|---|---|---|
| 7,883,793 | B2 * | 2/2011 | Niedzwiecki et al. | 429/120 |
| 2005/0089751 | A1 * | 4/2005 | Oogami et al. | 429/162 |
| 2005/0123828 | A1 * | 6/2005 | Oogami et al. | 429/152 |
| 2007/0289274 | A1 * | 12/2007 | Justice et al. | 55/511 |
| 2009/0325059 | A1 * | 12/2009 | Niedzwiecki et al. | 429/152 |
| 2010/0216007 | A1 * | 8/2010 | Kane et al. | 429/153 |
| 2011/0076540 | A1 * | 3/2011 | Ronning et al. | 429/120 |

OTHER PUBLICATIONS

Utility U.S. Appl. No. 12/789,888, filed May 28, 2010, Martz et al.
Utility U.S. Appl. No. 12/857,904, filed Aug. 17, 2010, Oury et al.
Utility U.S. Appl. No. 12/844,182, filed Jul. 27, 2010, Oury.

* cited by examiner

*Primary Examiner* — Carlos Barcena
*Assistant Examiner* — Michael Dignan
(74) *Attorney, Agent, or Firm* — Fraser Clemens Martin & Miller LLC; J. Douglas Miller

(57) ABSTRACT

A battery assembly including a plurality of battery cells and at least one frame having a support feature formed thereon is disclosed. The support feature supports electrically conductive tabs of the battery cells and militates against damage to the battery assembly during a joining of one of the electrically conductive tabs with another one of the electrically conductive tabs of an adjacent battery cell or during a joining of the electrically conductive tabs of adjacent battery cells with a connector.

20 Claims, 4 Drawing Sheets

SUPPORT FEATURE FOR JOINING OF BATTERY CELL TABS

FIELD OF THE INVENTION

The present disclosure relates to a battery pack and more particularly to a battery assembly for housing battery cells of the battery pack.

BACKGROUND OF THE INVENTION

A battery cell has been proposed as a clean, efficient and environmentally responsible power source for an electric device such as an electric vehicle, for example. Typically, a plurality of individual battery cells such as lithium-ion battery cells, for example, is provided to supply an amount of electric power sufficient to operate the electric device. The plurality of individual battery cells must be physically supported and protected, as well as be in electrical communication with each other and the electrical device. Further, it is often desired to provide cooling to the battery cells during a charging and a discharging thereof and venting to the battery cells to exhaust gasses, liquids, and solids that may be discharged therefrom. A battery pack including a battery assembly is typically provided to support, protect, and provide cooling to the battery cells and facilitate placing the battery cells in electrical communication with each other and the associated electrical device.

It is desirable to support the battery cells and militate against damage thereto during a joining of the adjacent individual battery cells with each other or with an electrical connector. Further, it is desirable to produce a battery assembly, wherein an ease of manufacturing the battery assembly is maximized and a cost thereof is minimized.

SUMMARY OF THE INVENTION

In concordance and agreement with the present invention, a battery assembly including a plurality of battery cells and at least one frame having a support feature formed thereon, wherein the support feature supports the battery cells and militates against damage to the battery assembly during a joining of the battery cells, has surprisingly been discovered.

In one embodiment, the battery assembly comprises: a plurality of battery cells having a first electrically conductive tab and a second electrically conductive tab formed thereon; and a frame disposed adjacent the battery cells in stacked relation, the frame including a support feature formed thereon, wherein the support feature supports one of the tabs of at least one of the battery cells.

In another embodiment, the battery assembly comprises: a plurality of battery cells having a first electrically conductive tab and a second electrically conductive tab formed thereon, wherein each of the battery cells is rotated with respect to an adjacent battery cell; and a frame disposed adjacent the battery cells in stacked relation, the frame including a support feature formed thereon, wherein the support feature supports the first electrically conductive tab of one of the battery cells and the second electrically conductive tab of the adjacent battery cell.

In another embodiment, the battery assembly comprises: a plurality of battery cells having a first electrically conductive tab and a second electrically conductive tab extending outwardly from a perimeter thereof, wherein each of the battery cells is rotated with respect to an adjacent battery cell; and a frame disposed adjacent the battery cells in stacked relation, the frame including a support feature formed thereon, wherein the support feature supports the first electrically conductive tab of one of the battery cells and the second electrically conductive tab of the adjacent battery cell during a joining process thereof, and wherein the battery cells are series-interconnected.

BRIEF DESCRIPTION OF THE DRAWINGS

The above, as well as other advantages of the present invention, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
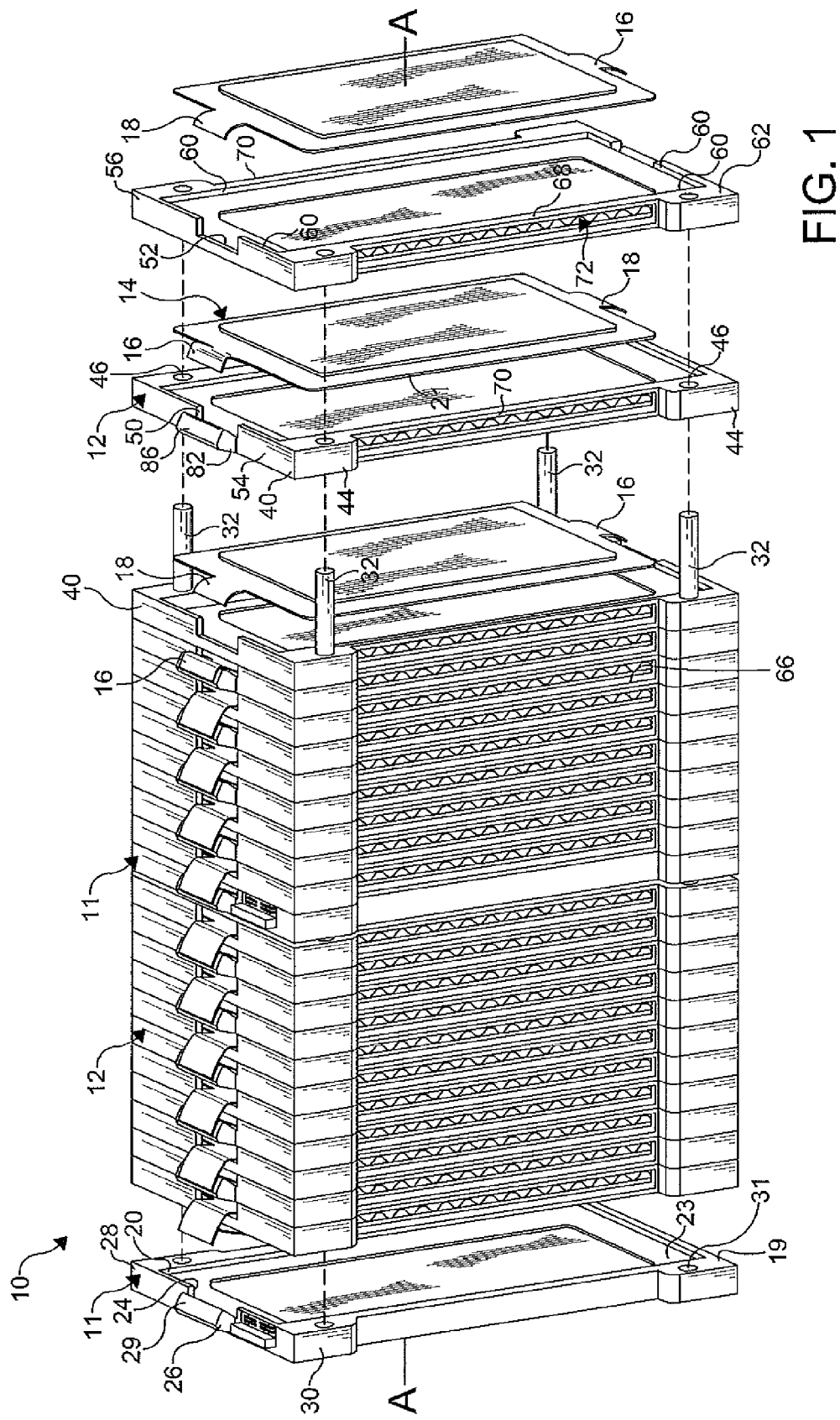
FIG. 1 is a partially exploded side perspective view of a battery assembly according to an embodiment of the present invention.

FIG. 1 shows a portion of a battery assembly 10 of a battery pack (not shown) according to an embodiment of the present invention. It is understood that the battery pack can be used for supplying electric power to an associated electric device such as an electric vehicle, for example. The battery assembly 10 includes end frames 11, a plurality of cooling modules 12, and a plurality of series-interconnected battery cells 14 having a first electrically conductive tab 16 and a second electrically conductive tab 18 extending outwardly therefrom. It is understood that the battery cells 14 can be any battery cells as desired such as lithium-ion battery cells, nickel-metal hydride battery cells, or other battery cells employing a different structure and electrochemistry, for example.

Although the end frame 11 shown has a generally rectangular shape, it is understood that the end frame 11 can have any shape as desired. The end frame 11 can be formed as a unitary frame by injection molding an electrically non-conductive material such as a nylon, polypropylene, metal, or other material having suitable physical and chemical properties, for example. It is understood that the end frame 11 can be formed by any suitable forming process as desired. The end frame 11 includes an exterior first side (not shown) and an interior second side 19. The first side may have a generally planar surface or may include any surface features as desired. Wall sections 20 are formed on the second side 19 of the end frame 11. The wall sections 20 and an interior surface 23 form a cavity for receiving one of the battery cells 14 therein. The wall sections 20 are designed to engage an outer perimeter 21 of the battery cell 14 and locate the battery cell 14 in mating contact with the interior surface 23. When the end frame 11 is placed in a stacked relation with the cooling modules 12 and the battery cells 14, the wall sections 20 of the end frame 11 abut an adjacent cooling module 12. A recess 24 is formed in a peripheral edge of the end frame 11 to receive one of the electrically conductive tabs 16, 18 of the battery cell 14 therein. As shown in FIG. 1, the recess 24 of the end frame 11 receives the electrically conductive tab 16 therein.

A support feature 26 is formed adjacent the recess 24 on a first portion 28 of the end frame 11. As illustrated, the support feature 26 has a generally rectangular shape with a sloped planar surface 29. In a non-limiting example, the planar surface 29 has a length of about 55 mm and a width of about 7.69 mm. It is understood that the support feature 26 can have any shape and size as desired. The support feature 26 shown is integrally formed with the end frame 11. It is understood, however, that the support feature 26 can be a separate component coupled to the end frame 11 by any suitable means. The support feature 26 may include a plurality of ribs (not shown) to provide strength and stability to the support feature 26.

Ears 30 are formed adjacent each corner of the end frame 11. An aperture 31 is formed in each of the ears 30 to receive a tension rod 32 of a compression assembly (not shown) therein. The tension rods 32 interconnect and align the end frame 11 and the cooling modules 12 to form the battery assembly 10 and the compression assembly applies a compressive force to the battery assembly 10 to hold the battery assembly in the stacked relation. In the stacked relation, the cooling modules 12 and the battery cells 14 are arranged in a repeating alternating pattern. The cooling modules 12 maintain a desired temperature of the battery assembly 10. It is understood that the cooling modules 12 may be of the type described in commonly owned U.S. patent application Ser. No. 12/789,888 incorporated herein by reference in its entirety. Each of the cooling modules 12 is rotated substantially 180 degrees with respect to a longitudinal axis A of the battery assembly 10 from each adjacent cooling module 12.

In the embodiment shown, each of the cooling modules 12 includes a frame 40 having an opening (not shown) formed through a central portion thereof. The frame 40 and the opening have a generally rectangular shape. It is understood that the frame 40 and the opening can have other shapes to accommodate a shape of the battery cell 14 such as square, circular, oval, and the like, for example. It is further understood that the frame 40 may have substantially the same shape as the end frame 11. The frame 40 can be formed as a unitary frame by injection molding a material such as a nylon, polypropylene, metal, or other material having suitable physical and chemical properties, for example. Ears 44 are formed adjacent each corner of the frame 40. An aperture 46 is formed in each of the ears 44 to receive the tension rod 32 therein.

Recesses 50, 52 for receiving the electrically conductive tabs 16, 18 therein are formed in peripheral edges of respective portions 54, 56 of the frame 40. Wall sections 60 are formed on a first side 62 of the frame 40. The wall sections 60 facilitate retention of one of the battery cells 14 between adjacent frames 40 and alignment of the frames 40 in the stacked relation. When the cooling modules 12 are placed in the stacked relation, the wall sections 60 of the frame 40 abut a second side 64, shown in FIG. 2, of the adjacent frame 40.

In the embodiment shown in FIG. 1, a slot 66 is formed in opposing legs 68, 70 of the frame 40. The slots 66 provide fluid communication through the legs 68, 70 with a cooling assembly 72 disposed in the opening of the frame 40. The cooling assembly 72, shown in FIG. 2, includes a separator plate 74 interposed between a first thermally conductive plate 76 and a second thermally conductive plate 78. As illustrated, the separator plate 74 has a substantially corrugated shape. It is understood, however, that the separator plate 74 can have any shape as desired. In a non-limiting example, the entire cooling assembly 72 is disposed in the opening of the frame 40. In another non-limiting example, the thermally conductive plates 76, 78 are affixed to the respective sides 62, 64 of the frame 40 to seal the opening of the frame and retain the separator plate 74 therein. It should also be understood that the thermally conductive plates 76, 78 can be integrally formed with the frame 40 by forming the frame 40 around the plates 76, 78 employing an injection molding process, for example. The separator plate 74 and the thermally conductive plates 76, 78 form a plurality of fluid flow channels 80 through an interior of the cooling assembly 72. The flow channels 80 extend between opposing edges of the cooling assembly 72 and are in fluid communication with the slots 66 formed in the legs 68, 70 of the frame 40.

Figure 2:
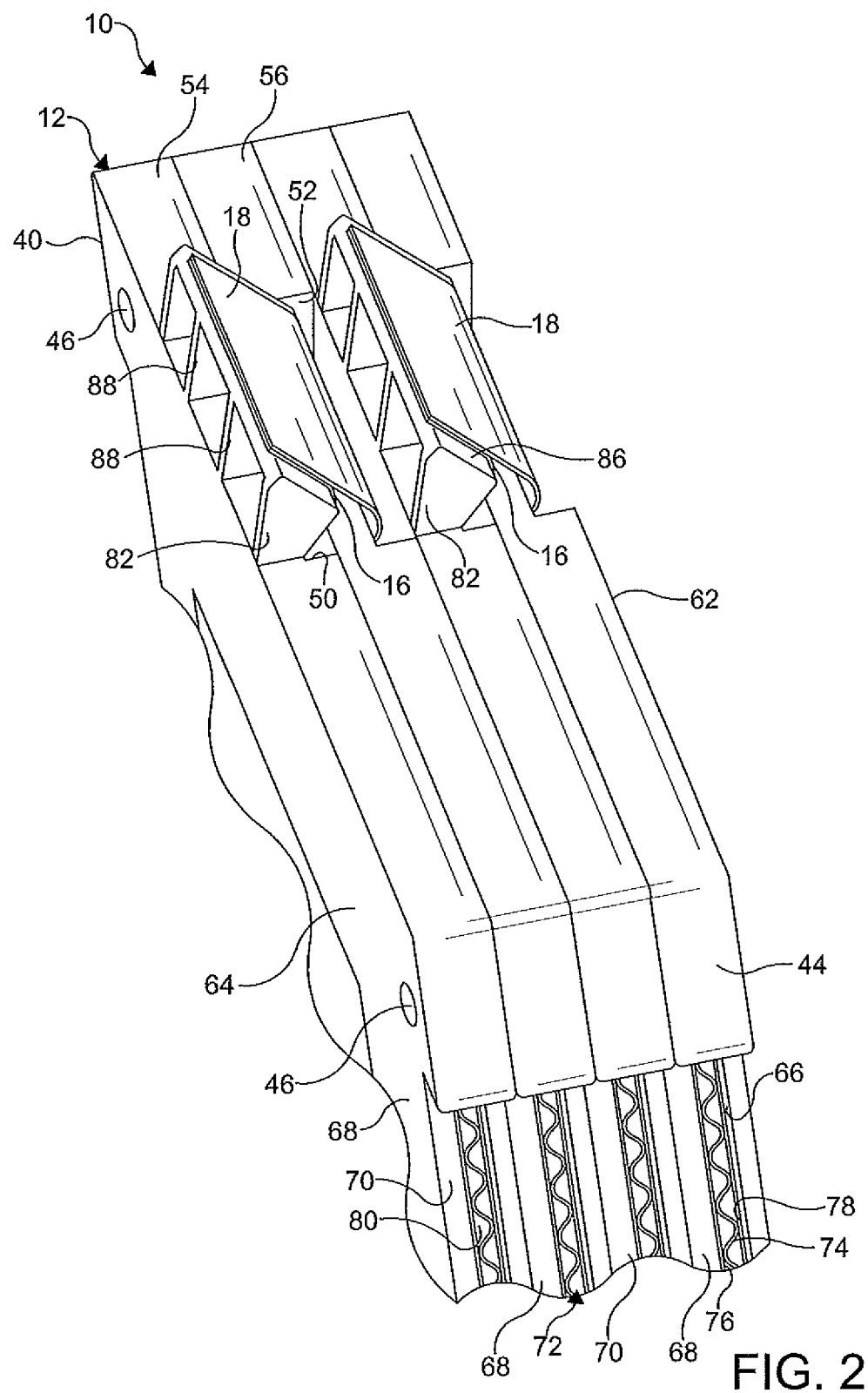
FIG. 2 is an enlarged fragmentary rear perspective view of electrically conductive tabs of the battery assembly illustrated in FIG. 1.

A support feature 82 is formed on the portion 54 of the frame 40 adjacent the recess 50. In the embodiment shown, the support feature 82 has a generally rectangular shape with a sloped planar surface 86. In a non-limiting example, the planar surface 86 has a length of about 55 mm and a width of about 7.69 mm. It is understood that the support feature 82 can have any shape and size as desired. The support feature 82 shown is integrally formed with the frame 40. It is understood, however, that the support feature 82 can be a separate component coupled to the frame 40 by any suitable means. The support feature 82 may include a plurality of ribs 88 to provide strength and stability to the support feature 82 as shown in FIG. 2.

In the embodiment shown in FIG. 1, the electrically conductive tabs 16, 18 extend outwardly from the perimeter 21 of the battery cell 14. It is understood that the electrically conductive tabs 16, 18 may extend outwardly from the battery cell 14 from any location along the perimeter 21 thereof as desired. In the embodiment shown, the first electrically conductive tab 16 is formed from an aluminum material, an aluminum clad material, or an aluminum plated material. The second electrically conductive tab 18 is formed from a copper material, a copper clad material, or a copper plated material. The first electrically conductive tab 16 and the second electrically conductive tab 18 extend outwardly from between two adjacent cooling modules 12 or from between the end frame 11 and an adjacent cooling module 12. Each of the battery cells 14 is rotated substantially 180 degrees with respect to the longitudinal axis A of the battery assembly 10 from each adjacent battery cell 14.

The battery cells 14 are arranged in series wherein the first electrically conductive tab 16 is electrically connected to the second electrically conductive tab 18 of an adjacent battery cell 14. Particularly, the electrically conductive tabs 16, 18 are bent substantially at an acute angle to be received on the planar surfaces 29, 86 of the support features 26, 82. Each of the support features 26, 82 receive the electrically conductive tab 16 of one of the battery cells 14 and the electrically conductive tab 18 of the adjacent battery cell 14 thereon. The support features 26, 82 support and hold the electrically conductive tabs 16, 18 together during a joining process thereof. It is understood that the electrically conductive tabs 16, 18 can be joined by any suitable process such as a welding process and a compression joining process, for example. It is further understood that the electrically conductive tabs 16, 18 may be formed in a desired shape to facilitate establishing the electrical connections therebetween. Additionally, the support features 26, 82 protect the battery assembly 10 from damage which may occur during the joining process such as shielding the battery assembly 10 from weld spatter or a laser beam signal that penetrates through both electrically conductive tabs 16, 18, for example.

To assemble the battery assembly 10, the end frames 11, the cooling modules 12 having the frame 40 and the cooling assembly 72 coupled thereto are positioned in the stacked relation. One of the battery cells 14 is disposed between one of the end frames 11 and the adjacent cooling module 12 and between successive cooling modules 12. The tension rods 32 of the compression assembly are then inserted in the apertures 31, 46 of the ears 30, 44 and coupled to the battery assembly 10 to apply the compressive force thereto.

In the stacked relation, each of the planar surfaces 29, 86 of the support features 26, 82 receive the electrically conductive tab 16 of one of the battery cells 14 and the electrically conductive tab 18 of the adjacent battery cell 14 thereon. The tabs 16, 18 are positioned and held together by the compressive force applied by the compression assembly on the battery assembly 10. Supported by the support features 26, 82, the tabs 16, 18 are then mechanically and electrically connected by the joining process, resulting in the battery cells 14 being electrically connected in series.

Figure 3:
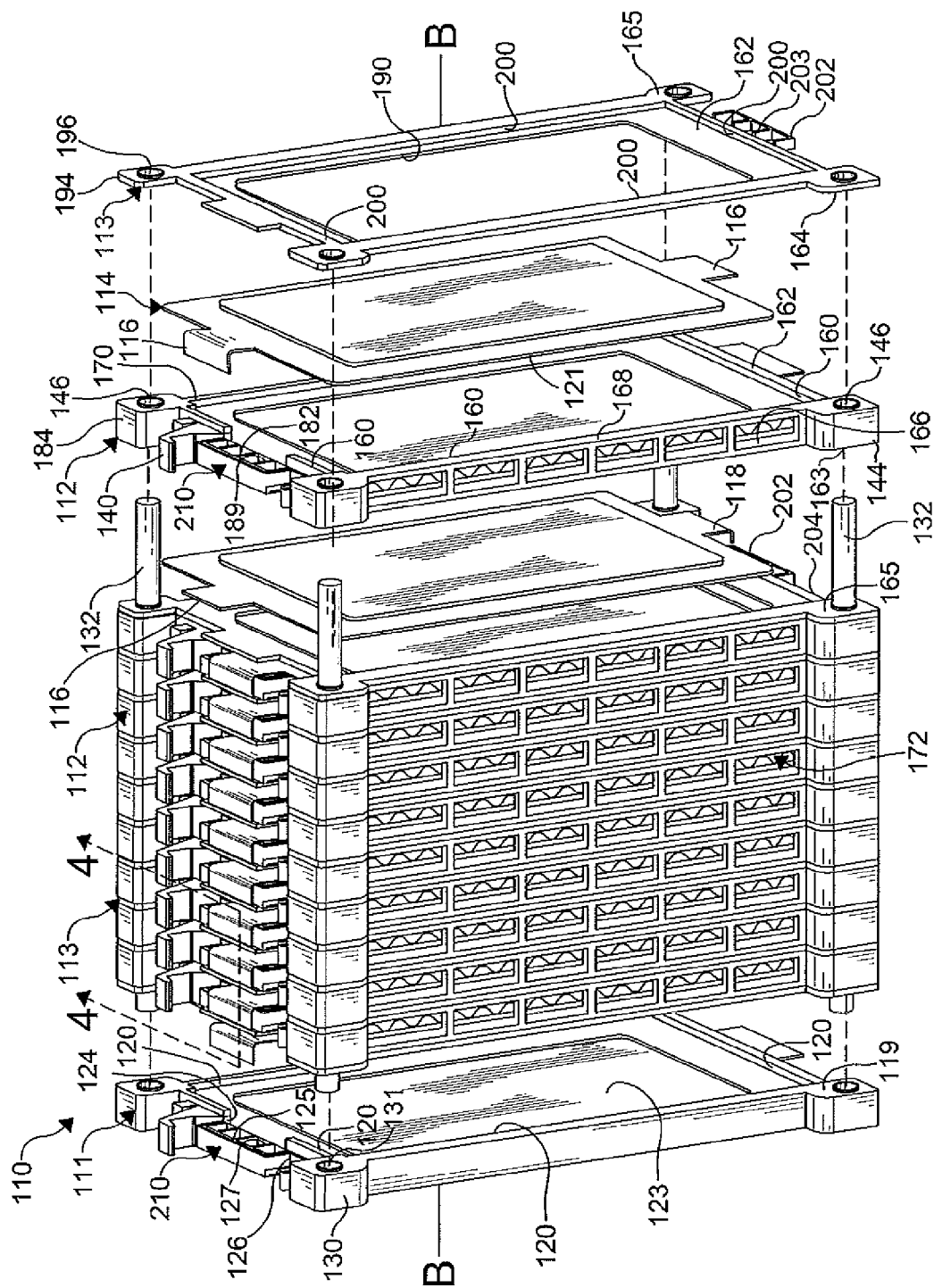
FIG. 3 is a partially exploded side perspective view of a battery assembly according to another embodiment of the present invention.

Referring now to FIG. 3, an alternative embodiment of the battery assembly 10 illustrated in FIGS. 1-2 is shown. The battery assembly 100 includes a plurality of end frames 111, a plurality of cooling modules 112, a plurality of spacer frames 113, and a plurality of series-interconnected battery cells 114 having a first electrically conductive tab 116 and a second electrically conductive tab 118 extending outwardly therefrom. It is understood that the battery cells 114 can be any battery cells as desired such as lithium-ion battery cells, nickel-metal hydride battery cells, or other battery cells employing a different structure and electrochemistry, for example.

Although each of the end frames 111 has a generally rectangular shape, it is understood that the end frames 111 can have any shape as desired. The end frames 111 can be formed as a unitary frame by injection molding an electrically non-conductive material such as a nylon, polypropylene, metal, or other material having suitable physical and chemical properties, for example. It is understood that the end frame 111 can be formed by any suitable forming process as desired. The end frame includes an exterior first side (not shown) and an interior second side 119. The first side may have a generally planar surface or may include any surface features as desired. Wall sections 120 are formed on the second side 119 of the end frame 111. The wall sections 120 and an interior surface 123 form a cavity for receiving one of the battery cells 114 therein. The wall sections 120 are designed to engage an outer perimeter 121 of the battery cell 114 and locate the battery cell 114 in mating contact with the interior surface 123. When the end frame 111 is placed in a stacked relation with the cooling modules 112, the spacer frames 113, and the battery cells 114, the wall sections 120 of the end frame 111 abut an adjacent cooling module 112 or an adjacent spacer frame 113. A recess 124 is formed in a peripheral edge of the end frame 111 to receive one of the electrically conductive tabs 116, 118 of the battery cell 114 therein. The recess 124 of the end frame 111 receives the electrically conductive tab 116 therein.

A support feature 125 is formed on a portion 126 of the end frame 111. In the embodiment shown, the support feature 125 has a generally inverted L-shaped cross-section with a first planar surface (not shown) and a second planar surface (not shown). The first planar surface is substantially parallel to a longitudinal axis B of the battery assembly 100. The second planar surface is adjacent the first planar surface and is substantially perpendicular to the longitudinal axis B. In a non-limiting example, the planar surfaces have a length of about 55 mm and a width of about 7.69 mm. It is understood that the support feature 125 can have any shape and size as desired. The support feature 125 shown is integrally formed with the end frame 111. It is understood, however, that the support feature 125 can be a separate component coupled to the end frame 111 by any suitable means. The support feature 125 may include a plurality of ribs 127 shown in FIG. 3 to provide strength and stability to the support feature 125.

Ears 130 are formed adjacent each corner of the end frame 111. An aperture 131 is formed in each of the ears 130 to receive a tension rod 132 of a compression assembly (not shown) therein. The tension rods 132 interconnect and align the end frames 111, the cooling modules 112, and the spacer frames 113 to form the battery assembly 100 and the compression assembly applies a compressive force to the battery assembly 100 to hold the battery assembly 100 in the stacked relation. In the stacked relation, the cooling modules 112, the battery cells 114, and the spacer frames 113 are arranged in a repeating pattern. The cooling modules 112 maintain a desired temperature of the battery assembly 100. It is understood that the cooling modules 112 may be of the type described in commonly owned U.S. patent application Ser. No. 12/789,888 incorporated herein by reference in its entirety.

Figure 4:
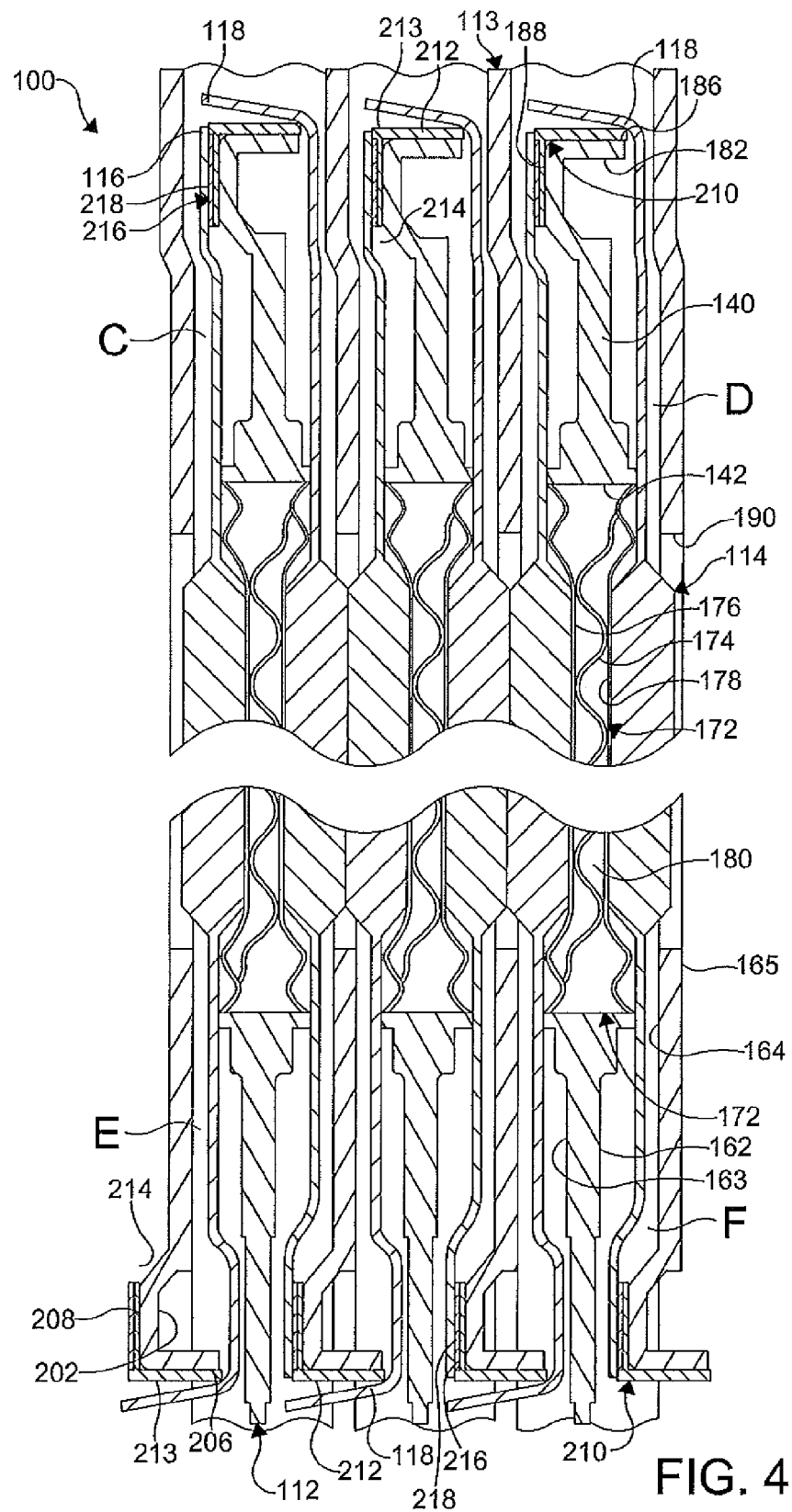
FIG. 4 is a fragmentary cross-sectional elevational view of a portion of a battery assembly taken along section line 4-4 in FIG. 3.

As illustrated in FIG. 4, each of the cooling modules 112 includes a frame 140 having an opening 142 formed through a central portion thereof. The frame 140 and the opening 142 have a generally rectangular shape. It is understood that the frame 140 and the opening 142 can have other shapes to accommodate a shape of the battery cell 114 such as square, circular, oval, and the like, for example. It is further understood that the frame 140 may have substantially the same shape as the end frame 111. The frame 140 can be formed as a unitary frame by injection molding a material such as a nylon, polypropylene, metal, or other material having suitable physical and chemical properties, for example. Ears 144 shown in FIG. 3 are formed adjacent each corner of the frame 140. An aperture 146 is formed in each of the ears 144 to receive the tension rod 132 therein.

Wall sections 160 are formed on a first side 162 and a second side 163 of the frame 140. The wall sections 160 facilitate retention one of the battery cells 114 between the frame 140 and the adjacent spacer frames 113 and alignment of the frames 113, 140 in the stacked relation. When the cooling modules 112 are placed in the stacked relation, the wall sections 160 on the first side 162 of the frame 140 abut a second side 164 of the adjacent spacer frame 113 and the wall sections 160 on the second side 163 of the frame 140 abut a first side 165 of the adjacent spacer frame 113.

In the embodiment shown, a plurality of slots 166 is formed in opposing legs 168, 170 of the frame 140. The slots 166 provide fluid communication through the legs 168, 170 with a cooling assembly 172 disposed in the opening 142. The cooling assembly 172, shown in FIG. 4, includes a separator plate 174 interposed between a first thermally conductive plate 176 and a second thermally conductive plate 178. As illustrated, the separator plate 174 has a substantially corrugated shape. It is understood, however, that the separator plate 174 can have any shape as desired. In a non-limiting example, the entire cooling assembly 172 is disposed in the opening 142. In another non-limiting example, the thermally conductive plates 176, 178 are affixed to the respective sides 163, 162 of the frame 140 to seal the opening 142 and retain the separator plate 174 therein. It should also be understood that the thermally conductive plates 176, 178 can be integrally formed with the frame 140 by forming the frame 140 around the plates 176, 178 employing an injection molding process, for example. The separator plate 174 and the thermally conductive plates 176, 178 form a plurality of fluid flow channels 180 through an interior of the cooling assembly 172. The flow channels 180 extend between opposing edges of the cooling assembly 172 and are in fluid communication with the slots 166 formed in the legs 168, 170 of the frame 140.

A support feature 182 is formed on a portion 184 of the frame 140. In the embodiment shown in FIG. 4, the support feature 182 has a generally inverted L-shaped cross-section with a first planar surface 186 and a second planar surface 188. As illustrated, the first planar surface 186 is substantially parallel to the longitudinal axis B of the battery assembly 100. The second planar surface 188 is adjacent the first planar surface 186 and is substantially perpendicular to the longitudinal axis B. In a non-limiting example, the planar surfaces 186, 188 have a length of about 55 mm and a width of about 7.69 mm. It is understood that the support feature 182 can have any shape and size as desired. The support feature 182 shown is integrally formed with the frame 140. It is understood, however, that the support feature 182 can be a separate component coupled to the frame 140 by any suitable means. The support feature 182 may include a plurality of ribs 189 shown in FIG. 3 to provide strength and stability to the support feature 182.

As illustrated, each of the spacer frames 113 has an opening 190 formed through a central portion thereof. The spacer frame 113 and the opening 190 have a generally rectangular shape. It is understood that the spacer frame 113 and the opening 190 can have other shapes to accommodate a shape of the battery cell 114 such as square, circular, oval, and the like, for example. It is further understood that the spacer frame 1113 may have substantially the same shape as the end frame 111 or the frame 140 of the cooling module 112 if desired. The spacer frame 113 can be formed as a unitary frame by injection molding a material such as a nylon, polypropylene, metal, or other material having suitable physical and chemical properties, for example. Ears 194 shown in FIG. 3 are formed adjacent each corner of the spacer frame 113. An aperture 196 is formed in each of the ears 194 to receive the tension rod 132 therein.

Wall sections 200 are formed on the first side 165 and the second side 164 of the spacer frame 113. The wall sections 200 facilitate retention one of the battery cells 114 between the spacer frame 113 and the adjacent frame 140 of the cooling module 112 and alignment of the frames 113, 140 in the stacked relation. When the spacer frames 113 are placed in the stacked relation, the wall sections 200 on the first side 165 abut the second side 163 of the adjacent frame 140 and the wall sections 200 on the second side 164 abut the first side 162 of the adjacent frame 140.

A support feature 202 is formed on a portion 204 of the spacer frame 113. In the embodiment shown in FIG. 4, the support feature 202 has a generally inverted L-shaped cross-section with a first planar surface 206 and a second planar surface 208. As shown, the first planar surface 206 is substantially parallel to the longitudinal axis B of the battery assembly 100. The second planar surface 208 is adjacent the first planar surface 206 and is substantially perpendicular to the longitudinal axis B. In a non-limiting example, the planar surfaces 206, 208 have a length of about 55 mm and a width of about 7.69 mm. It is understood that the support feature 202 can have any shape and size as desired. The support feature 202 shown is integrally formed with the spacer frame 113. It is understood, however, that the support feature 202 can be a separate component coupled to the spacer frame 113 by any suitable means. The support feature 202 may include a plurality of ribs 203 shown in FIG. 3 to provide strength and stability to the support feature 202.

A connector 210 is affixed to the support features 125, 182, 202. It is understood that the connector 210 can be integrally formed with the frames 111, 113, 140 by forming the frames 111, 113, 140 around the connector 210 employing an injection molding process, for example. The connector 210 is at least partially formed from any suitable electrically conductive material such as a copper material, a copper clad material, or a copper plated material, for example. The connector 210 has a generally inverted L-shaped cross-section having a first portion 212 received on the planar surfaces 186, 206 of the support features 125, 182, 202 and a second portion 214 received on the planar surfaces 188, 208 of the support features 125, 182, 202. As shown, the first portion 212 having a substantially planar surface 213 is substantially parallel to the longitudinal axis B of the battery assembly 100. The second portion 214 is substantially perpendicular to the longitudinal axis B and includes an inlay element 216 having a substantially planar surface 218. In the embodiment shown, the inlay element 216 is at least partially formed from any suitable electrically conductive material such as an aluminum material, an aluminum clad material, or an aluminum plated material, for example.

In the embodiment shown in FIG. 3, the electrically conductive tabs 116, 118 extend outwardly from the perimeter 121 of the battery cell 114. It is understood that the electrically conductive tabs 116, 118 may extend outwardly from the battery cell 114 from any location along the perimeter 121 thereof as desired. In the embodiment shown, the first electrically conductive tab 116 is formed from an aluminum material, an aluminum clad material, or an aluminum plated material. It is understood that the first electrically conductive tab 116 can be formed from any electrically conductive material as desired. It is further understood that the first portion 212 of the connector 210 can be formed from the electrically conductive material used to form the first electrically conductive tab 116. The second electrically conductive tab 118 is formed from a copper material, a copper clad material, or a copper plated material. It is understood that the second electrically conductive tab 118 can be formed from any electrically conductive material as desired. It is further understood that the second portion 214 of the connector 210 can be formed from the electrically conductive material used to form the second electrically conductive tab 118. Each of the battery cells 114 is rotated substantially 180 degrees with respect to the longitudinal axis B of the battery assembly 100 from each adjacent battery cell 114. As illustrated in FIG. 4, the first electrically conductive tab 116 extends outwardly into gaps C, F formed between the frame 140, the connector 210, and the adjacent spacer frame 113 or end frame 111. The second electrically conductive tab 118 extends outwardly through gaps D, E formed between the frame 140 and the adjacent spacer frame 113 or the end frame 111.

The battery cells 114 are arranged in series wherein the first electrically conductive tab 116 is electrically connected to the connector 210 of the adjacent battery cell 114 and the second electrically conductive tab 118 is electrically connected to the connector 210 of the adjacent battery cell 114. Particularly, the first electrically conductive tab 116 is received on the planar surface 218 of the inlay element 216. The second electrically conductive tab 118 is bent substantially at an acute angle to be received on the planar surface 213 of the first portion 212 of the connector 210. The support features 125, 182, 202 support and hold the connector 210 and the electrically conductive tabs 116, 118 together during a joining process thereof. It is understood that the electrically conductive tabs 116, 118 can be joined by any suitable process such as a welding process and a compression joining process, for example. It is further understood that the electrically conductive tabs 116, 118 may be formed in a desired shape to facilitate establishing the electrical connections therebetween.

Additionally, the support features 125, 182, 202 protect the battery assembly 100 from damage which may occur during the joining process such as shielding the battery assembly 100 from weld spatter or a laser beam signal that penetrates through the electrically conductive tabs 116, 118, and the connector 210, for example.

To assemble the battery assembly 100, the end frames 111, the cooling modules 112 having the frame 140 and the cooling assembly 172 coupled thereto, and the spacer frames 113 are positioned in the stacked relation. One of the battery cells 114 is disposed between one of the end frames 111 and the adjacent cooling module 112 or spacer frame 113 and between one of the spacer frames 113 and the adjacent cooling module 112. The tension rods 132 of the compression assembly are then inserted in the apertures 131, 146, 196 of the ears 130, 144, 194 and coupled to the battery assembly 100 to apply a compressive force thereto.

In the stacked relation, the planar surface 213 of the connector 210 affixed to the support features 125, 182, 202 receives the electrically conductive tab 118 of one of the battery cells 114. The electrically conductive tab 116 of the adjacent battery cell 114 is received on the planar surface 218 of the inlay element 216 of the connector 210. The tabs 116, 118 are positioned and held in contact with the connector 210 by the support features 125, 182, 202 and the compressive force applied by the compression assembly on the battery assembly 100. Supported by the support features 125, 182, 202, the tabs 116, 118 are then mechanically and electrically connected to the connector 210 by the joining process, resulting in the battery cells 114 being electrically connected in series.

While certain representative embodiments and details have been shown for purposes of illustrating the invention, it will be apparent to those skilled in the art that various changes may be made without departing from the scope of the disclosure, which is further described in the following appended claims.

What is claimed is:

1. A battery assembly, comprising:
   a plurality of battery cells, wherein each battery cell has a first electrically conductive tab and a second electrically conductive tab formed thereon; and
   a plurality of frames, wherein each frame is disposed adjacent one of the battery cells, the frames in stacked relation with the battery cells, every other frame including a support feature formed on a peripheral edge thereof, the support feature extending outwardly from the frames and configured to support contact of one of the tabs of one of the battery cells with one of the tabs of another of the battery cells and receive the first electrically conductive tab of one of the battery cells and the second electrically conductive tab of another one of the battery cells thereon, and the plurality of frames including at least two frames that each include one of the support features,
   further comprising a plurality of ribs coupling the support feature to a remainder of the frame, the plurality of ribs providing strength and stability to the support feature.

2. The battery assembly according to claim 1, wherein each of the battery cells is rotated with respect to each adjacent battery cell.

3. The battery assembly according to claim 1, wherein the tabs extend outwardly from a perimeter of each of the battery cells.

4. The battery assembly according to claim 1, wherein the support feature includes at least one substantially planar surface for receiving the one of the tabs of the at least one of the battery cells thereon.

5. The battery assembly according to claim 1, further comprising a connector at least partially received on the support feature.

6. The battery assembly according to claim 5, wherein the connector abuts and is joined with the one of the tabs of the at least one of the battery cells.

7. The battery assembly according to claim 5, wherein the connector includes an inlay element for abutting and joining with the one of the tabs of the at least one of the battery cells.

8. The battery assembly according to claim 5, wherein the connector includes a portion for abutting and joining with the first electrically conductive tab of one of the battery cells and an inlay element for abutting and joining with the second electrically conductive tab of another one of the battery cells.

9. The battery assembly according to claim 1, wherein the frames include one of an end frame, a spacer frame, and a frame of a cooling module.

10. The battery assembly according to claim 1, further comprising at least one recess formed in the peripheral edge of each of the frames and configured to receive one of the first electrically conductive tab and the second electrically conductive tab, wherein the support feature is formed adjacent the at least one recess of every other frame.

11. A battery assembly, comprising:
    a plurality of battery cells, each battery cell having a first electrically conductive tab and a second electrically conductive tab formed thereon, wherein each of the battery cells is rotated with respect to an adjacent battery cell; and
    a plurality of frames, wherein each frame is disposed adjacent one of the battery cells, the frames in stacked relation with the battery cells, every other frame including a support feature formed on a peripheral edge thereof, the support feature extending outwardly from the frames and configured to support contact of the first electrically conductive tab of one of the battery cells with the second electrically conductive tab of the adjacent battery cell and receive the first electrically conductive tab of one of the battery cells with the second electrically conductive tab of the adjacent battery cell thereon, and the plurality of frames including at least two frames that each include one of the support features,
    further comprising a plurality of ribs coupling the support feature to a remainder of the frame, the plurality of ribs providing strength and stability to the support feature.

12. The battery assembly according to claim 11, wherein the first electrically conductive tab and the second electrically conductive tab extend outwardly from a perimeter of each of the battery cells.

13. The battery assembly according to claim 11, wherein the support feature includes at least one substantially planar surface for receiving the first electrically conductive tab of the one of the battery cells and the second electrically conductive tab of the adjacent battery cell thereon.

14. The battery assembly according to claim 11, further comprising a connector at least partially received on the support feature, wherein a first portion of the connector abuts and is joined with the first electrically conductive tab of the one of the battery cells and a second portion of the connector abuts and is joined with the second electrically conductive tab of the adjacent battery cell.

15. The battery assembly according to claim 14, wherein the first portion of the connector and the first electrically conductive tab of the battery cells are formed from a substantially similar material.

16. The battery assembly according to claim 14, wherein the connector further comprises an inlay element disposed in the second portion thereof.

17. The battery assembly according to claim 16, wherein the inlay element of the connector abuts and is joined with the second electrically conductive tab of the battery cells.

18. The battery assembly according to claim 16, wherein the inlay element of the connector and the second electrically conductive tab of the battery cells are formed from a substantially similar material.

19. A battery assembly, comprising:
a plurality of battery cells, each battery cell having a first electrically conductive tab and a second electrically conductive tab extending outwardly from a perimeter thereof, wherein each of the battery cells is rotated with respect to an adjacent battery cell; and
a plurality of frames, wherein each frame is disposed adjacent one of the battery cells, the frames in stacked relation with the battery cells, every other frame including a support feature formed on a peripheral edge thereof, the support feature extending outwardly from the frames and configured to support contact of the first electrically conductive tab of one of the battery cells with the second electrically conductive tab of the adjacent battery cell and receive the first electrically conductive tab of one of the battery cells with the second electrically conductive tab of the adjacent battery cell thereon during a joining process thereof, the battery cells being series-interconnected, and the plurality of frames including at least two frames that each include one of the support features,
further comprising a plurality of ribs coupling the support feature to a remainder of the frame, the plurality of ribs providing strength and stability to the support feature.

20. The battery assembly according to claim 19, further comprising a connector at least partially received on the support feature, wherein a first portion of the connector abuts and is joined with the first electrically conductive tab of the one of the battery cells and an inlay element disposed in a second portion of the connector abuts and is joined with the second electrically conductive tab of the adjacent battery cell.

\* \* \* \* \*